(12) United States Patent
Jorgovanovic et al.

(10) Patent No.: US 10,270,481 B1
(45) Date of Patent: Apr. 23, 2019

(54) WIRELESS COMMUNICATION RECEIVER GAIN MANAGEMENT SYSTEM

(71) Applicant: AMAZON TECHNOLOGIES, INC., Seattle, WA (US)

(72) Inventors: Milos Jorgovanovic, Santa Clara, CA (US); Pratik Kalpesh Patel, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/978,493

(22) Filed: Dec. 22, 2015

(51) Int. Cl.
    *H04B 1/06* (2006.01)
    *H04B 7/00* (2006.01)
    *H04B 1/12* (2006.01)

(52) U.S. Cl.
    CPC .................................... *H04B 1/123* (2013.01)

(58) Field of Classification Search
    CPC .............................. G01S 5/0221; G01S 5/0226
    USPC ........................ 455/226.2, 226.4, 232.1–254
    See application file for complete search history.

(56) References Cited

U.S. PATENT DOCUMENTS

| | | | | |
|---|---|---|---|---|
| 5,745,521 A * | 4/1998 | Sugita | ................... | H03G 3/3052 370/342 |
| 6,665,286 B1 * | 12/2003 | Maruta | ................ | H04B 7/0851 370/335 |
| 6,668,163 B1 * | 12/2003 | Usui | ..................... | H04W 28/18 455/234.1 |
| 6,678,509 B2 * | 1/2004 | Skarman | .............. | H03G 3/3078 455/226.3 |
| 8,099,123 B2 * | 1/2012 | Tomasin | .............. | H04B 1/7103 340/318 |
| 9,155,097 B2 * | 10/2015 | Li | .......................... | H01Q 1/246 |
| 2002/0072343 A1 * | 6/2002 | Miyatani | .............. | H04B 7/0848 455/272 |
| 2006/0063485 A1 * | 3/2006 | Gainey | ............. | H04B 7/15542 455/15 |
| 2006/0092881 A1 * | 5/2006 | Laroia | .................. | H04B 1/7097 370/331 |
| 2006/0223471 A1 * | 10/2006 | Dupuie | ................. | H04B 1/123 455/234.2 |
| 2007/0232327 A1 * | 10/2007 | Laroia | ..................... | F01D 9/023 455/456.1 |
| 2010/0222063 A1 * | 9/2010 | Ishikura | ................ | H04B 7/024 455/450 |
| 2011/0176644 A1 * | 7/2011 | Sadek | .................. | H03G 3/3052 375/345 |
| 2012/0088531 A1 * | 4/2012 | Bonneville | ....... | H04W 52/0206 455/500 |
| 2012/0276863 A1 * | 11/2012 | Li | ........................ | H03G 3/3078 455/226.1 |
| 2013/0336371 A1 * | 12/2013 | Chen | .................... | H03G 3/3068 375/219 |

(Continued)

*Primary Examiner* — Edward F Urban
*Assistant Examiner* — Rui M Hu
(74) *Attorney, Agent, or Firm* — Lindauer Law, PLLC

(57) ABSTRACT

A first device may establish wireless connections with multiple devices using a single channel. The first device acquires reception data about these multiple devices that is indicative of a device identifier and received signal strength at the first device. Based on the reception data, a receiver gain is determined. A wireless network interface is configured to use the receiver gain. As a result, communication between the first device and the multiple devices is improved.

21 Claims, 7 Drawing Sheets

(56) References Cited

U.S. PATENT DOCUMENTS

2015/0281908 A1* 10/2015 Venkatraman .......... H04W 4/04
455/456.6

* cited by examiner

WIRELESS COMMUNICATION RECEIVER GAIN MANAGEMENT SYSTEM

BACKGROUND

Wireless network interfaces allow a variety of devices to communicate with one another. These devices may include tablet computers, remote controls, set-top-boxes, access points, and so forth. A receiver in the wireless network interface of that device detects a wireless signal. Gain of a receiver may be adjustable. Insufficient gain may result in an inability to detect the wireless signal.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
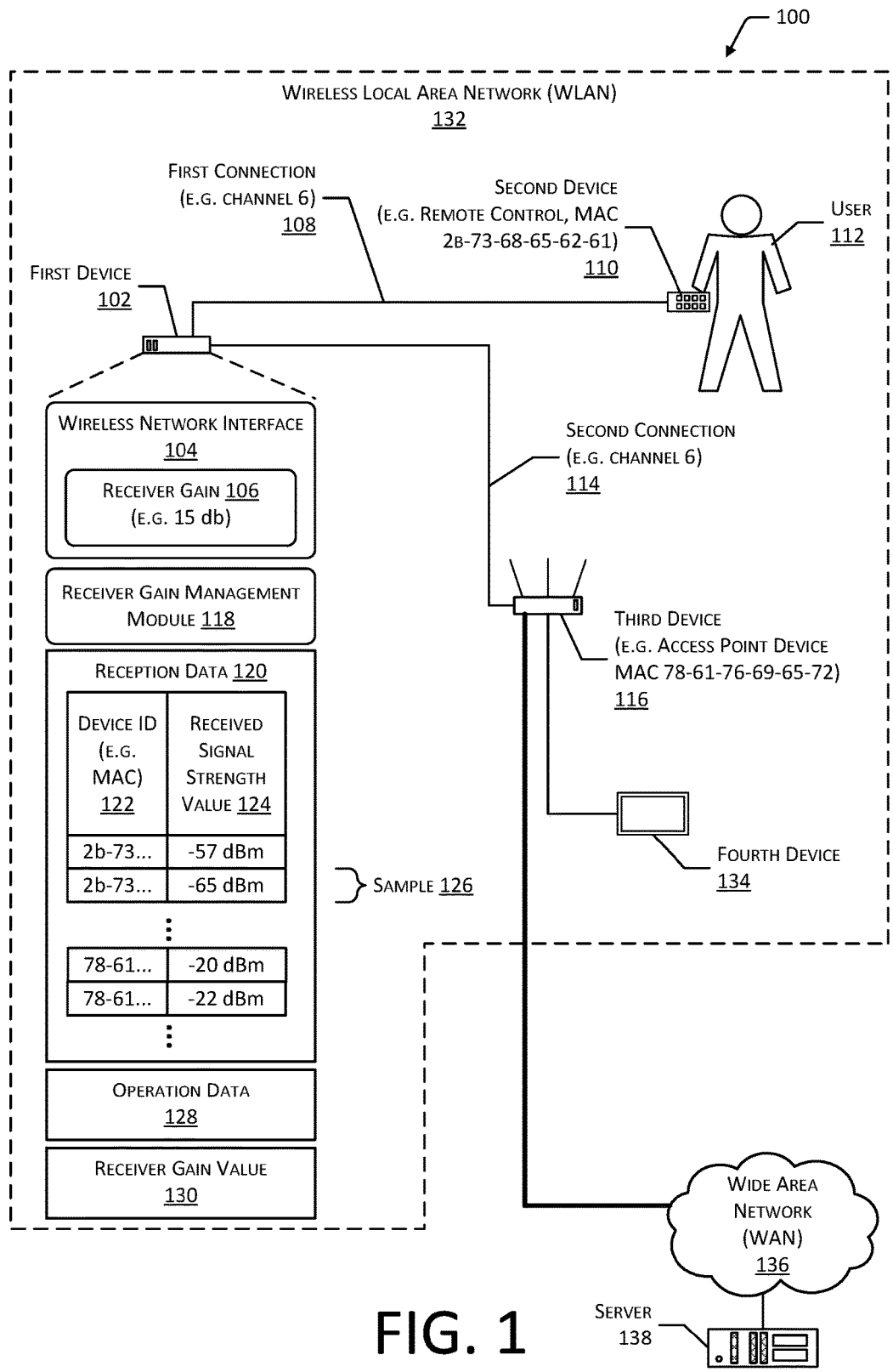
FIG. 1 is an illustrative system of determining receiver gain for a wireless network interface of a first device, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A wireless network interface allows one device to communicate with one or more other devices. The wireless network interface may use one or more wireless networking technologies, such as Wi-Fi, Bluetooth, Bluetooth Low Energy (BLE), ZigBee, and so forth. These devices may include tablet computers, remote controls, set-top-boxes (STB), televisions, access points, sensors, home automation devices, security systems, and so forth.

The wireless network interface includes a radio with a receiver that detects a radio frequency (RF) wireless signal. The wireless signal may be transmitted at one or more frequencies. In some situations, a particular frequency or group of frequencies may be referred to as a "channel".

The receiver may include one or more amplification devices, such as transistors. These amplification devices provide gain that increases amplitude of an incoming signal on the channel. For example, in a software device radio (SDR) the RF gain of a low-noise amplifier may be adjusted to change the amount of amplification provided to a signal obtained from an antenna. The output from the amplifier device may be provided to an analog-to-digital (ADC) or another device for further processing. Subsequently, information about the signal as produced by the ADC may be filtered or otherwise processed to produce an effect as though an amplifier device was used. In receivers using analog circuitry, gain at different stages such as an input RF amplifier, intermediate frequency amplifier, and so forth may be adjusted.

Given a particular gain setting of one or more of the amplifier devices in the receiver, the receiver exhibits a particular sensitivity. The sensitivity of a receiver is indicative of a minimum input signal level that is detectable by the receiver. In some implementations sensitivity may be further described as the minimum input signal level that is detectable and may be demodulated or otherwise processed by subsequent elements of the receiver. For ease of discussion, and not necessarily as a limitation, "receiver gain" is indicative of one or more of gain of a particular amplifier device, group of amplifier devices in the receiver, or software module providing signal processing equivalent to amplification.

During operation, the gain of the receiver may be adjusted to increase or decrease amplification. For example, the receiver gain may be decreased in the presence of very strong received signals to reduce overload of subsequent stages in the receiver. In another example, the receiver gain may be increased to allow for the reception of relatively weak signals.

Wireless data networks are commonplace, and the number of devices using wireless data networks continues to grow. A given channel may have any number of transmitters sending wireless signals, noise sources generating RF noise in the channel, and so forth. Depending on a variety of factors, including distance between a transmitter and receiver, transmitter output power, antenna gain of the transmitter and receiver, and receiver gain, a receiver in a wireless network interface may detect many signals at different received signal strengths.

A single channel may be used to communicate with multiple devices. A first device such as a STB or television may establish a connection with an access point device on the channel using the receiver. The access point (AP) device may provide the first device with a connection to another network. For example, the AP device may connect to a wide area network such as the internet. During operation, the first device may receive data, such as video content that may then be presented on the television or another display device. If the connection with the AP device fails, operation of the first device may be significantly impacted. Continuing the example, without the internet connection provided by the AP device, the television may have little or no content to present on the display.

The first device may also establish a contemporaneous connection with a second device using the same receiver and channel. For example, the second device may comprise a remote control, smartphone, or other device that connects to the first device using the Wi-Fi Direct protocol. The first device may further establish contemporaneous connections with other devices using the same receiver and channel. One advantage of contemporaneous connections on the same channel is that the time, power, or other impacts associated with reconfiguring the receiver to switch between channels may be reduced or eliminated. Another advantage is that a less expensive single channel receiver design may be implemented, removing the need for channel agility.

The contemporaneous connections on the same channel introduce complexity with regard to the receiver gain to be used. In a traditional system, a connection to the AP device may be given priority such that the receiver gain in the wireless network interface of the first device is adjusted to maintain that AP device connection. For example, the receiver gain may be decreased when the first device receives a relatively strong signal from the AP device. However, with this situation, the receiver gain may result in a decrease in sensitivity to levels below those needed to support communication with the second device, which may have a relatively weak signal. As a result, the connection to the AP may be sufficient to maintain reliable communications, but other contemporaneous connections to other devices may be adversely affected.

As a result, the traditional techniques of adjusting receiver gain may result in reliable communication with one device while impairing communication with another device. This may result in an adverse user experience. For example, the user may have installed a STB device within a few feet of their AP device. The user may be using a remote control to control the STB device. With traditional systems the strong transmitter power and the short distance between the STB device and the AP device would result in the receiver in the STB device being set to a relatively low receiver gain value. In comparison, the remote control may have relatively low transmitter power output to provide extended battery life, and is farther away from the STB device than the AP device. As a result, the wireless signal transmitted by the remote control may be too low to be detected by the receiver in the STB device, given the low receiver gain value. From the user's point of view, the STB device is able to stream video, but the remote control "doesn't work".

Described in this disclosure are techniques to determine a receiver gain value for use with a receiver that supports multiple connections to different devices on a channel. Reception data is acquired about network traffic associated with connections to the devices. Other network traffic that is detected by the receiver but associated with other unconnected devices may be disregarded in some implementations. The reception data includes a device identifier, such as a media access control (MAC) address, and a received signal strength value (RSSV). For example, in implementations where the network interface implements at least a portion of the Wi-Fi protocol, the RSSV may comprise one or more of a received signal strength indicator (RSSI) or received channel power indicator (RCPI). The reception data may include multiple samples. For example, the RSSV for packets received from each of the connected devices may be stored in the reception data. In some situations, the RSSV may itself be an average or other calculated value determined by the radio. For example, the RSSV may comprise an average of received signal strength values obtained during reception of a single packet.

A calculated value may be determined for each of the connected devices. For example, a first moving average of the RSSV values for the remote control may be calculated, and a second moving average of the RSSV values for the AP device may be calculated. The number of samples used for the first and second moving averages may be the same or different. For example, because the remote control is deemed to be more mobile than the AP device, the first moving average may use more samples than the second moving average.

A determination may be made as to which device identifier requires the greatest gain to maintain communication. In one implementation, the moving average that exhibits the lowest RSSV may be designated as a minimum calculated value.

The minimum calculated value may then be used to determine an initial gain value. For example, a lookup table or function may describe a relationship between a particular RSSV or range of RSSV values and receiver gain needed for the receiver to produce a level of sensitivity sufficient to maintain communication.

The initial gain value may then be summed with a gain overhead value to generate the receiver gain value. The gain overhead value specifies additional gain to reduce the impact of variations in the wireless signal. For example, the gain overhead value may comprise sufficient gain due to a change in orientation or polarization of the remote control antenna relative to the STB device's antenna.

The determination of the receiver gain value may be ongoing and may be recalculated. For example, the receiver gain value may be updated every 5 seconds, 1000 samples, at a change in state of connection, on user demand, and so forth.

The receiver gain value may be used to configure the receiver of the wireless network interface. By utilizing the receiver gain value, the receiver maintains sensitivity that may be sufficient to detect the signal for the multiple devices connected to the first device. As a result, communication between the devices may be improved, the experience may be improved, and so forth.

While the wireless network interfaces are described as using radio frequency signals, in other implementations the techniques herein may be applied to other types of signals. For example, the receiver gain management module may adjust the receiver gain of a wireless network interface that uses optical, acoustic, magnetic, or other signals.

Illustrative System

FIG. 1 is an illustrative system 100 of determining receiver gain for a wireless network interface used to communicate with devices, according to one implementation. These devices may include tablet computers, remote controls, set-top-boxes (STB), television, access points, sensors, home automation devices, security systems, and so forth.

Depicted is a first device 102 that includes a wireless network interface (network interface) 104. In one implementation, the first device 102 may comprise a STB or television. The network interface 104 includes a radio receiver or other detection circuitry that may be configured with a particular receiver gain 106. For example, the receiver gain 106 is indicative of a level of amplification applied to a wireless signal being processed by the receiver. The amplification may be expressed in decibels (dB).

The first device 102 may use the network interface 104 to establish the first connection 108 with a second device 110. For example, the network interface 104 may be compliant with at least a portion of the Wi-Fi protocol in the connection with the second device 110 may utilize Wi-Fi Direct. In the implementation depicted here, the second device 110 may comprise a remote control. The user 112 may use the remote control 110 to provide input to the first device 102.

The first device 102 may also establish a second connection 114 with a third device 116. For example, the third device 116 may comprise an access point device that provides connectivity to a wired portion of the network, or another network. The first connection 108 and the second connection 114 may utilize the same channel or channels. In other implementations, the first connection 108 and the second connection 114 may use channels that may be adjacent to one another with respect to frequency, interfere with one another, and so forth.

During operation, the first device 102 may use a network interface 104 to send, receive, or send and receive data to or from the second device 110 or the third device 116. The data may be sent in groups of symbols, such as a packet (or frame) having a header and a payload.

A component of the network interface 104 such as the receiver is designed to detect wireless signals produced by transmitters. For example, the receiver may be configured to detect radio frequency (RF) signal sent by transmitters on the second device 110, the third device 116, and so forth. One or more amplifier devices in the receiver may be configured to provide the receiver gain 106 described above.

A receiver gain management module 118 is configured to access reception data 120, utilize operation data 128, and generate a receiver gain value 130 that may be used to set the receiver gain 106 of the network interface 104. The reception data 120 may comprise data indicative of a device identifier (ID) 122 and a received signal strength value (RSSV) 124. While this and the following illustration depict data being stored in tabular format, it is understood that other data structures may be used to store information as described herein.

The device ID 122 provides information indicative of a particular device that is transmitting a wireless signal. For example, the device ID 122 may comprise a media access control (MAC) address. Continuing the example, the MAC address may be retrieved from a header of a packet transmitted wirelessly. In another example, the device ID 122 may comprise a source internet protocol (IP) address. In other implementations the device ID 122 may be assigned by a received device based on analysis of the received signal. For example, the device ID 122 may be based on a spectral analysis of the signal as received and used to distinguish one device from another.

The RSSV 124 may comprise or be based at least in part on one or more of a received signal strength indicator (RSSI) or received channel power indicator (RCPI). For example, as described in the Institute for Electrical and Electronics Engineers (IEEE) standard 802.11, the RSSI provides information about signal strength during a preamble of a packet, while RCPI provides information about signal strength over the preamble and the entire received packet. In other implementations, other metrics indicative of signal strength of the wireless signal at the receiver may be used. The RSSV 124 may be expressed in terms of dB, decibels above a reference level of 1 milliwatt (dBm), microvolts, as a dimensionless value, and so forth. For example, the RSSV 124 may be expressed as an eight bit value ranging from 0 to 255.

The RSSV 124 may be based on one or more discrete samples made by a component of the radio in the wireless network interface 104. For example, the radio receiver in the wireless network interface 104 may obtain a thousand samples per second that are indicative of received power of a particular signal. These samples may then be processed to generate the RSSV 124 which is subsequently used by the receiver gain management module 118.

The reception data 120 may include multiple samples 126 of RSS of the values 124. For example, with each packet of data received by the first device 102 from connection, a sample 126 may be acquired and stored. In other implementations, the samples 126 may be obtained under other conditions or based on other criteria. For example, the sample 126 may be every $n^{th}$ packet (where n is a nonzero integer) that is received by the network interface 104.

The receiver gain management module 118 may use the reception data 120 in conjunction with the operation data 128 to generate the receiver gain value 130. For example, for each of the different device IDs 122, a moving average of the RSS may be calculated. The resulting moving average value that is indicative of the least or lowest received signal strength may be used to determine the receiver gain value 130. Operation of the receiver gain management module 118 and the operation data 128 is described in more detail below with regard to FIG. 2 and later.

The first device 102 may connect to, or be within receiving range of, a wireless local area network 132 (WLAN). In this illustration, the third device 116 is an access point for the WLAN 132. A fourth device 134 may connect to the third device 116. The third device 116 may in turn connect to a wide area network 136. One or more servers 138 may be accessible via the WAN 136. The fourth device 134 may be connected to the third device 116. However, there is no direct connection between the first device 102 and the fourth device 134. Should the first device 102 or the fourth device 134 need to communicate with the other the third device 116, acting as the access point, would relay this data.

The receiver gain management module 118 of the first device 102 may be configured to acquire reception data 120 associated only with those connections to which the first device 102 is a party. For example, packets transmitted between the third device 116 and the fourth device 134 may be omitted from the reception data 120 as acquired by the first device 102. In other implementations, the network interface 104 may operate in a promiscuous mode, and may capture information about connections including those that involve the first device 102 and those that do not.

In some implementations, the receiver gain management module 118 may utilize reception data 120 about non-connected devices. For example, the receiver gain value 130 may be decreased based at least in part on the determination that the channel used by the first connection 108 and the second connection 114 is congested beyond a threshold amount. Continuing the example, congestion may be determined based on percentage of time wireless signals are detected on the channel over a specified period of time.

While the system 100 is described as determining the receiver gain value 130 for the first device 102 with respect to the second device 110 and third device 116, it is understood that these techniques may be extended to apply to any number of devices. For example, the techniques may be used when the first device 102 has a third connection (not shown) made with a fifth device (not shown), and so forth.

Figure 2:
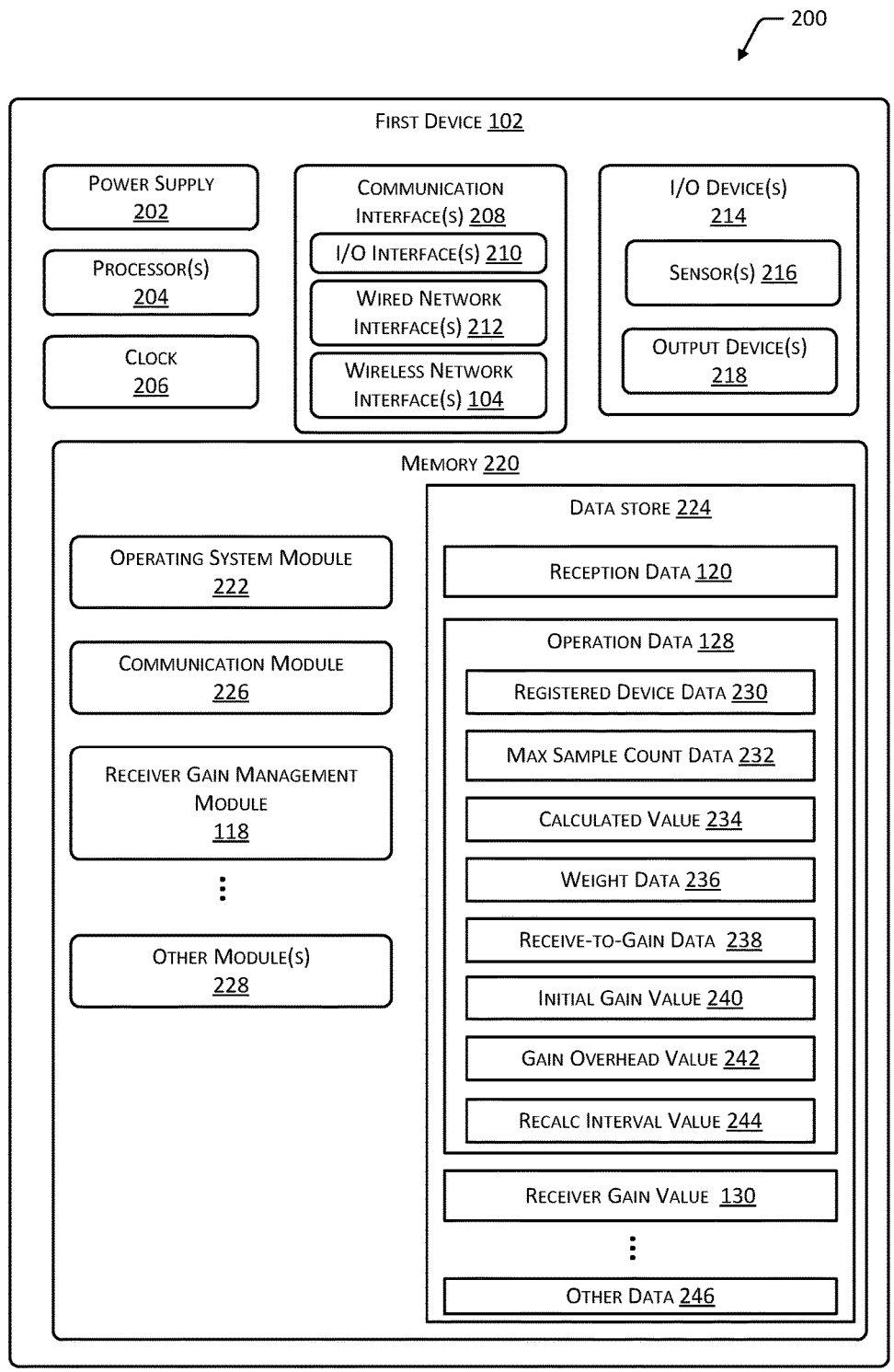
FIG. 2 illustrates a block diagram of the first device, according to one implementation.

FIG. 2 illustrates a block diagram 200 of the first device 102, according to one implementation. One or more power supplies 202 are configured to provide electrical power suitable for operating the components in the first device 102. In some implementations, the power supply 202 may include a single use battery, a rechargeable battery, a fuel cell, a photovoltaic cell, a wireless power receiver, a thermoelectric generator, and so forth.

The first device 102 may include one or more hardware processors 204 (processors) configured to execute one or more stored instructions. The processors 204 may comprise one or more cores. One or more clocks 206 may provide information indicative of date, time, ticks, and so forth. For example, the processor 204 may use data from the clock 206 to generate a timestamp, trigger a preprogrammed action, and so forth. In some implementations, one or more of the components described with regard to the first device 102 may be implemented by one or more of an application specific integrated circuit (ASIC), system-on-a-chip (SOC), a microcontroller, and so forth.

The first device 102 may include one or more communication interfaces 208 such as I/O interfaces 210, wired network interfaces 212, wireless network interfaces 104, and so forth. The communication interfaces 208 enable the first device 102, or components thereof, to communicate with other devices or components. The communication interfaces 208 may include one or more I/O interfaces 210. The I/O interfaces 210 may comprise interfaces such as Inter-Integrated Circuit (I2C), Serial Peripheral Interface bus (SPI), Universal Serial Bus (USB), RS-232 interface, Peripheral Component Interconnect Express (PCIe), Secure Digital Input Output (SDIO), and so forth.

The I/O interface(s) 210 may couple to one or more I/O devices 214. The I/O devices 214 may include input devices such as one or more sensors 216. The sensors 216 may include the touch sensor, buttons, proximity sensors, switches, and so forth. The I/O devices 214 may also include output devices 218. For example, the output devices 218 may include one or more of a light emitting diode display, a liquid crystal display, an electrophoretic display, coaster display, a speaker, a haptic output device, and so forth. In some embodiments, the I/O devices 214 may be physically incorporated with the first device 102 or may be externally placed.

The wireless network interfaces 104 and wired network interfaces 212 are configured to provide communications between the first device 102 and other devices, such as routers, access points, other user devices, and so forth. The wireless network interfaces 104 and wired network interfaces 212 may include devices configured to couple to personal area networks (PANs), local area networks (LANs), wide area networks (WANs), and so forth. The wireless network interface 104 may comprise one or more components such as radio receivers, radio transmitters, and so forth. The wireless network interface 104 may include devices compatible with Wi-Fi, Bluetooth, ZigBee, 2G, 3G, 4G, LTE, and so forth. In comparison, the wired network interface 212 may include devices compatible with Ethernet.

The first device 102 may also include one or more busses or other internal communications hardware or software that allow for the transfer of data between the various modules and components of the first device 102.

As shown in FIG. 2, the first device 102 includes one or more memories 220. The memory 220 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the first device 102. A few example functional modules are shown stored in the memory 220, although the same functionality may alternatively be implemented in hardware, firmware, or as a system on a chip (SOC).

The memory 220 may include at least one operating system OS module 222. The OS module 222 is configured to manage hardware resource devices such as the I/O interfaces 210, the wireless network interface 104, the wired network interface 212, the I/O devices 214, and provide various services to applications or modules executing on the processors 204. The OS module 222 may implement a variant of the FreeBSD operating system as promulgated by the FreeBSD Project, other UNIX or UNIX-like variants, a variation of the Linux operating system as promulgated by Linus Torvalds, the Windows operating system from Microsoft Corporation of Redmond, Wash., or other operating system.

Also stored in the memory 220 may be a data store 224 and one or more of a communication module 226, the receiver gain management module 118, or other modules 228. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including one or more computing devices, network attached storage devices, and so forth.

The communication module 226 may be configured to establish connections with one or more of the second device 110, the third device 116, or other devices. The communications may be authenticated, encrypted, and so forth.

The receiver gain management module 118 is configured to generate the receiver gain value 130. The receiver gain value 130 may then be used to set the receiver gain 106 of the wireless network interface 104.

The receiver gain management module 118 may be configured to acquire and store the reception data 120. For example, the receiver gain management module 118 may send instructions to the wireless network interface 104 to provide information about received packets.

The receiver gain management module 118 may access registered device data 230. The registered device data 230 provides information indicative of particular devices for which RSSVs 124 are to be considered in the determination of the receiver gain value 130. The registered device data 230 may comprise one or more of the device IDs 122 of all devices currently connected to the first device 102, the device IDs 122 that are configured to be connected to the first device 102, or the device IDs 122 that are expected to be connected to the first device 102. In one implementation, the registered device data 230 may be acquired during a pairing or connection process between the first device 102 and another device to establish a connection. In another implementation, the registered device data 230 may be received from an external source such as the server 138, or from input by the user 112.

In some implementations, the receiver gain management module 118 may access maximum sample count data 232 that indicates a maximum number of samples 126 to be used in the determination of a calculated value 234. The maximum sample count data 232 may be used to constrain the number of samples and thus the history of reception data 120 that is used in determining the receiver gain value 130. For example, where a particular connection is deemed to be more stable, fewer samples 126 may be used to determine the receiver gain value 130 compared to a less stable connection in which a relatively larger number of samples 126 may be better suited to reflect the dynamic nature of that less stable connection. In other implementations, other data may specify a rate at which samples 126 are to be acquired. For example, a sample rate may specify 10 samples per second.

The maximum sample count data 232, sample rate data, or other data associated with the collection or analysis of the reception data 120 may be associated with a particular device or type of device. For example, a particular device ID 122 may be associated with particular maximum sample count data 232. In another example, a type of device such as an access point may be associated with a particular sample rate. The maximum sample count data 232, sample rate data, and so forth may be static or dynamically adjustable. In one implementation, a static value of the maximum sample count data 232 for particular type of device may be specified. In another implementation, the number of samples used to generate calculated value 234 may vary, such as based at least in part on the variability between the individual RSSVs 124. For example, where the RSSVs 124 have a standard deviation which is extremely large, the number of samples 126 used to generate the calculated value 234 may be increased.

The calculated value 234 may be determined using one or more analytical techniques. A calculated value 234 may be determined for each device ID 122. In one implementation, the calculated value 234 may comprise a moving average. In other implementations, other techniques such as cumulative moving averages, weighted moving averages, exponential moving averages, standard deviation, minima, maxima, mode, and so forth may be utilized to determine the calculated value 234.

In some implementations, weight data 236 may be utilized in the determination of calculated value 234. In one of these implementations, the weight data 236 may include particular coefficients or multipliers to be applied to a particular moving average. Continuing the example, a first moving average associated with a first device ID 122 is multiplied by a weight of 0.9 while the second moving average associate with a second device ID 122 is multiplied by a weight of 1.2.

In another of these implementations, the weight data 236 may comprise a weight profile specifying particular coefficients or multipliers for particular terms used to calculate the value of the calculated value 234. For example, the weight profile may specify that, while calculating a weight moving average, a first RSSV 124 is multiplied by a weight of 0.3, a second RSSV 124 is multiplied by a weight of 0.2, a third RSSV 124 is multiplied by a weight of 0.1, and so forth. In some implementations, the sum of the weights used may equal 1.0.

The receiver gain management module 118 as described above produces a set of one or more calculated values 234 for at least a portion of the device IDs 122. For example, as illustrated in FIG. 1 where the first device 102 is maintaining the first connection 108 and the second connection 114, a first calculated value 234 may be generated indicative of a moving average of the RSSVs 124 associated with the device ID 122 for the second device 110. Continuing the example, a second calculated value 234 may be generated indicative of a moving average of the RSSVs 124 associate with the device ID 122 for the third device 116.

The set of one or more calculated values 234 may then be analyzed to generate an intermediate value. This intermediate value may be indicative of a lowest level of signal received by the wireless network interface 104 that relates to either the first connection 108 or the second connection 114. For example, the intermediate value may comprise a minimum calculated value that indicates the first or second moving average that is associated with the lowest or least signal strength as measured by the wireless network interface 104.

The receiver gain management module 118 may access receive-to-gain (RTG) data 238. The RTG data 238 provides an association between a particular received signal strength and a corresponding gain of the receiver. The RTG data 238 is described in more detail below with regard to FIG. 3. The intermediate value is assessed using RTG data 238 and an initial gain value 240 is determined. For example, based on the RTG data 238 an intermediate value of −58 dBm may be determined to use 22 dB of gain at the receiver to maintain communication.

In some implementations, the initial gain value 240 may be further adjusted using a gain overhead value 242 to generate the receiver gain value 130. The gain overhead value 242 provides a margin of additional gain to help maintain communication due to minor changes in link quality. For example, the gain overhead value 242 may comprise 5 dB, to allow for signal fading, polarization changes, movement of one or more of the devices involved in the connection, and so forth. The gain overhead value 242 may be added to the initial gain value 240 to generate the receiver gain value 130.

The gain overhead value 242 may be fixed, determined based on one or more attributes of the connection, dynamically adjustable, and so forth. The gain overhead value 242 may be a fixed value 240 such as 5 dB. This amount of gain may then be added to or subtracted from the initial gain value 240 to determine the receiver gain value 130.

The gain overhead value 242 may be determined based on the one or more attributes of the connection. For example, band, a mode of operation, type of modulation, coding rate, channel data rate, and so forth may be considered and determine different gain overhead values 242 with each unique variation or groups of variations. Continuing the example, gain overhead value 242 when the receiver is operating in the 2.4 GHz band may be 5 dB while the gain overhead value 242 when the receiver is operating in the 5 GHz band may be 7 dB.

The gain overhead value 242 may change based at least in part on one or more of time, amount of data transferred, number of connections, and so forth. In one implementation, the gain overhead value 242 may decrease from a first point to a second point over a particular period of time. For example, the gain overhead value 242 may start at 10 dB and then decrease over 15 minutes to 5 dB. The change in the gain overhead value 242 may be responsive to other information provided by the wireless network interface 104. For example, if a connection is lost following a decrease in the gain overhead value 242, the gain overhead value 242 may be increased or returned to a previous level.

Instead of, or in addition to, the use of the gain overhead value 242, an RSSV overhead value may be incorporated into the RSSV 124 by the receiver gain management module 118 to determine the calculated value 234. For example, an RSSV overhead value of −3 dBm may be added to a particular RSSV 124. Continuing the example, where the sample 126 of the RSSV 124 is −57 dBm and the RSSV overhead value of −3 dBm, the RSSV 124 representative of the sample 126 that is subsequently used to generate the calculated value 234 may have a value of −60 dBm.

The receiver gain management module 118 may be configured to recalculate the receiver gain value 130. For example, a recalc interval value 244 stored in the data store 224 may indicate that the receiver gain value 130 is to be recalculated every five seconds. In other implementations, the recalculate interval value 244 may specify a number of packets, change in connection state, and so forth. For example, a change in channel, disconnection of communication, and so forth may result in a recalculation of the receiver gain value 130.

In some implementations, a recalculation of the receiver gain value 130 may include clearing or disregarding at least a portion of the reception data 120 that has been previously acquired. For example, if the first connection 108 and the second connection 114 transition from using channel 6 to using channel 36, the reception data 120 associated with channel 6 may be disregarded from further consideration.

The other modules 228 may also be present in the memory 220, as well as other data 246 in the data store 224. For example, a content presentation module may be configured to retrieve content from the server 138 such as audio or video and present that content using one or more of the output devices 218.

Figure 3:
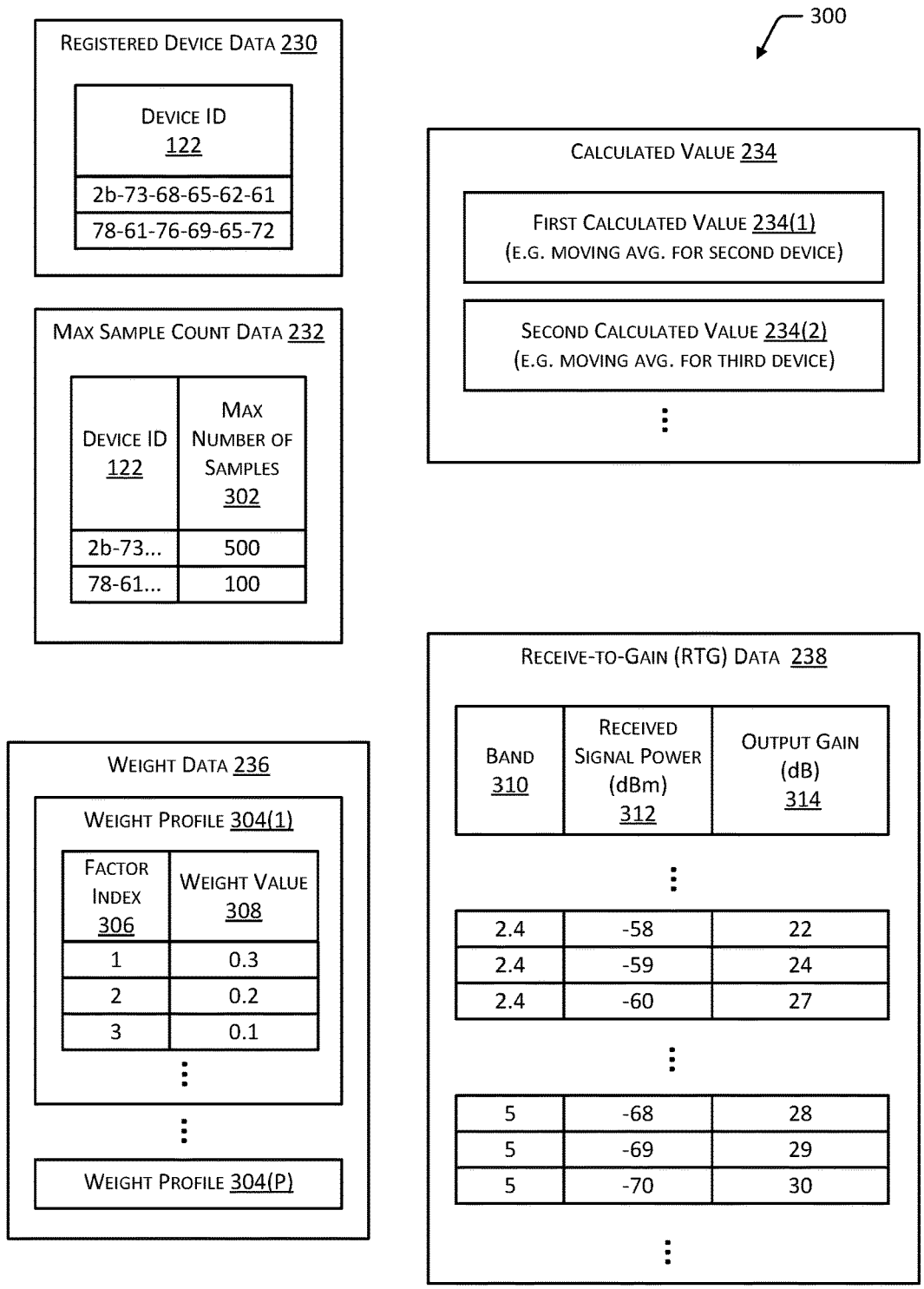
FIG. 3 illustrates a block diagram of a portion of operation data that may be used by the first device, according to one implementation.

FIG. 3 illustrates a block diagram 300 of a portion of the operation data 128 that may be used by the first device 104, according to one implementation. As described above, the registered device data 230 may comprise one or more device ID 122. The particular devices indicated by the device IDs 122 are those for which reception data 120 may be used by the receiver gain management module 118 to determine the receiver gain value 130. In some implementations, the registered device data 230 may be generated when a connection is established, a device is paired with the first device 102, and so forth. In other implementations, the registered device data 230 may be received from the server 138, from input provided by the user 112, and so forth.

The maximum sample count data 232 is depicted here. The max sample count data 232 may comprise a device ID 122 and a value indicative of a maximum number of samples 302. For example, the MAC address of the second device 110 is associated with a value of 500 as the maximum number of samples 302 for which the receiver gain management module 118 will consider when generating the calculated value 234 associated with the second device 110. In some implementations, a max number of samples 302 may be associated with a particular type of device. For example, a device designated as a remote control may have a different max number of sample 302 value than a device designated as an access point.

The calculated values 234 are also depicted here. The first calculated value 234(1) may comprise a moving average of the most recent 500 samples 126 of the reception data 120 that are associated with the second device 110. The second calculated value 234(2) may comprise a moving average of the most recent 100 samples 126 of the reception data 120 that are associated with the third device 116. In some implementations, a calculated value 234 may be determined for each device ID 120 to present in the registered device data 230.

As described above, in some implementations the receiver gain management module 118 may use weight data 236 to generate a calculated value 234, or an intermediate value. The weight data 236 may include one or more weight profiles 304. Each weight profile 304 may include a factor index 306 and associated weight 308. The factor index 306 may indicate a particular one of the RSSVs 124 that are associated with a given device ID 122. For example, the factor index 306 of 1 may indicate the most recent RSSV 124, the factor index of 2 may indicate the second most recent RSSV 124, and so forth. By utilizing the weight profile 304 the receiver gain management module 118 may be able to generate a receiver gain value 130 that more accurately represents the conditions under which the wireless network interface 104 is operating. For example, the weight values 308 may describe a linearly decreasing value, an exponentially decreasing value, a nonlinear curve, and so forth. Continuing the example, with the weight values 308 decreasing in an exponential fashion, more recent samples 126 of RSSVs 124 have a greater influence on the calculated value 234 than older samples 126.

The weight data 236 may be generated manually, such as by a developer or system administrator. In some implementations, the weight data 236 may be generated automatically or dynamically. For example, different weight data 236 may be used to generate successive receiver gain values 130 and a quality may be determined for the different weight data 236. For example, quality may be indicative of a number of disconnects that a particular device ID 122 experienced during a given period of time. The weight data 236 that results in a number of disconnects exceeding a threshold value may be discarded. The weight data 236 may be then modified and tested to determine which weight data 236 provides operation within or exceeding specified parameters.

The RTG data 238 provides an association between a particular received signal strength and a corresponding gain of the receiver. The RTG data 238 is described in more detail below with regard to FIG. 3. The intermediate value is assessed using RTG data 238 and an initial gain value 240 is determined. For example, based on the RTG data 238 an intermediate value of −58 dBm may be determined to use 22 dB of gain at the receiver to maintain communication.

As described above, the RTG data 238 provides an association between a particular received signal strength value and a corresponding gain of the receiver. The corresponding gain may be selected to provide a desired level of performance with regard to the wireless network interface 104. For example, the corresponding gain may be that specified to allow the modulation of a received signal at the particular received signal strength with an error rate that is less than a specified threshold value.

The RTG data 238 may be stored as a data structure that associates one or more attributes with a particular gain value. For example, as illustrated here the RTG data 238 comprises a lookup table that includes information indicative of a band 310, received signal power 312, and output gain 314. The band 310 may be indicative of a particular channel or range of frequencies. The receiver may have different performance characteristics based at least in part on the particular channel or range of frequencies. By providing RTG data 238 with this level of granularity, overall performance of the system may be improved. In some implementations, other attributes may be included in the RTG data 238. For example, a mode of operation, type of modulation, coding rate, channel data rate, and so forth may be considered. Continuing the example, the receiver sensitivity and thus the associated receiver gain 106 may vary based on whether binary phase shift keying (BPSK) or quadrature amplitude modulation (QAM) is used.

The receiver gain management module 118 may use the RTG data 238 to look up a particular output gain 314 given a specified band of 310 and received signal power 312. For example, given the band 310 being 2.4 GHz and a received signal power 312 of −58 dBm, the output gain 314 of 22 dB may be determined.

The RTG data 238 may be determined experimentally, theoretically, or a combination thereof. For example, one or more controlled tests may be performed to generate the RTG data 238. In another example, real-world usage and data obtained therefrom may be used to generate the RTG data 238. In yet another example, a theoretical model or simulation may be used to generate the RTG data 238.

Figure 4:
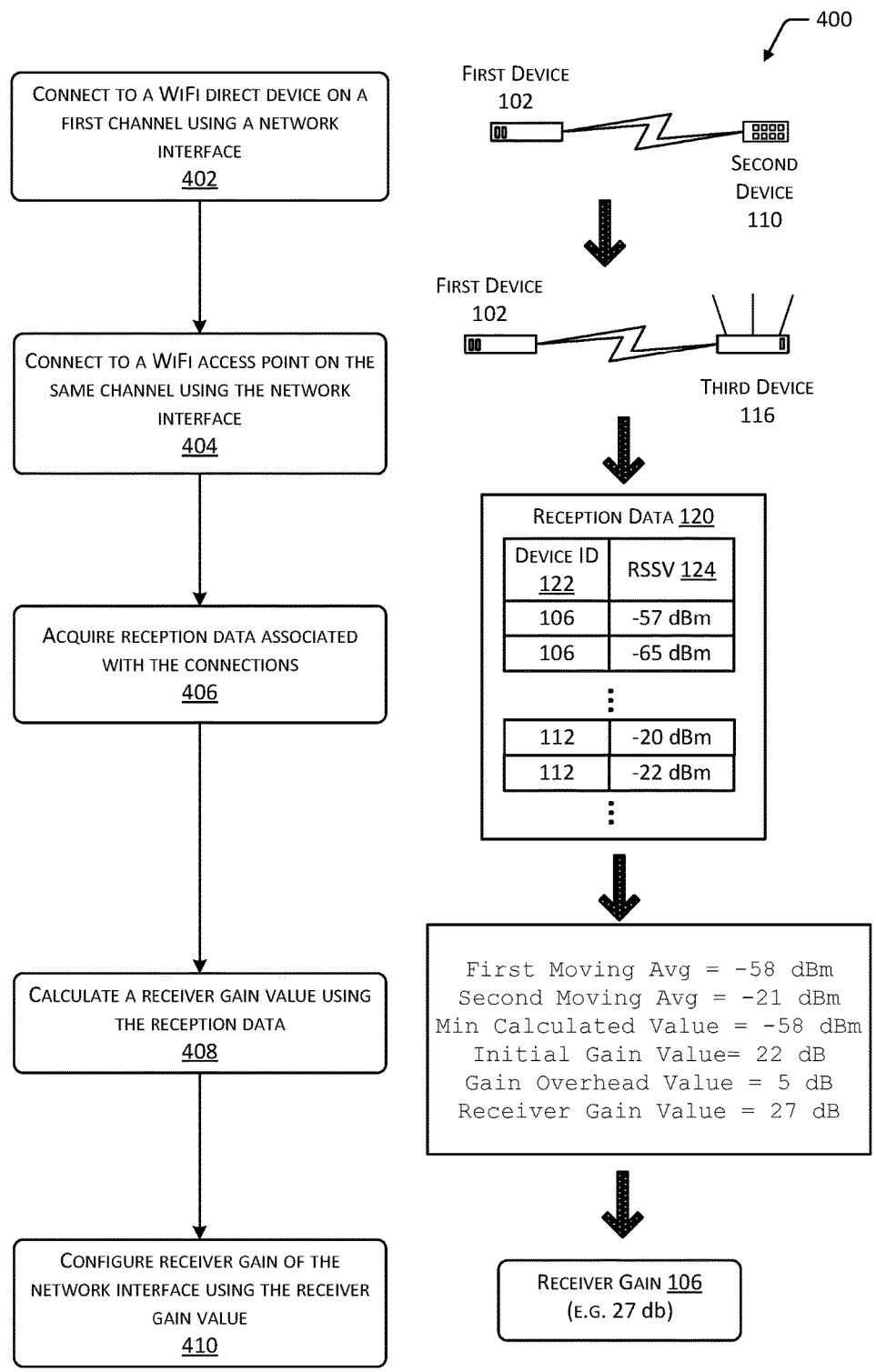
FIG. 4 illustrates a scenario in which a receiver gain value is determined, according to one implementation.

FIG. 4 illustrates a scenario 400 in which a receiver gain value 130 is determined, according to one implementation. At 402 the first device 102 connects to a second device 110 on a first channel using a network interface 104. For example, this connection may utilize Wi-Fi Direct protocol such that the first device 102 acts as an access point to the second device 110. This establishes a first connection 108 between the first device 102 and the second device 110. A default value of the receiver gain 106 may be set to a relatively high value to facilitate communication with other devices.

At 404 the first device 102 connects to a third device 116, such as an access point, on the same first channel using the network interface 104. For example, this connection may utilize typical Wi-Fi connection in an infrastructure mode with the access point acting as a host for the connection. This establishes a second connection 114 between the first device 102 and the third device 116. In other implementations, the second connection 114 may use other protocols or configurations. For example, the second connection 114 may also be a Wi-Fi Direct protocol connection.

At 406 reception data 120 that is associated with the connections is acquired. For example, the wireless network interface 104 may be configured to generate data indicative of the device ID 122 and the RSSV 124 for individual packets for which a connection is being maintained. In some implementations, the acquisition of the reception data 120 may be constrained to only collect information associated with registered devices indicated by the registered device data 230. In other implementations, reception data 120 may be acquired from nonregistered devices.

At 408 a receiver gain value 130 is calculated using the reception data 120. For example, as described above a first calculated value 234(1) associated with the second device 110 may be a moving average of the most recent 500 samples of RSSV 124 data from that device. Continuing the example, as described above a second calculated value 234(2) associated with the third device 116 may be a moving average of the most recent 100 samples of RSSV 124 data from that device.

An intermediate value may be determined based on one or more of the calculated values 234. For example, the intermediate value may comprise the calculated value 234 that is a minimum calculated value. The minimum calculated value is indicative of a lowest or weakest signal strength at the receiver. In this example, the first calculated value 234(1) is a moving average having a value of −58 dBm while the second calculated value 234(2) is a moving average having a value of −21 dBm. With regard to the dBm units shown here, the −58 dBm value is indicative of a weaker signal received at the receiver than the −21 dBm value. As a result, the −58 dBm value may be designated as the minimum calculated value.

The receiver gain management module 118 may calculate the initial gain value 240 by using the minimum calculated value 234 as the received signal power 312 to determine the output gain 314. In this example, the input of −58 dBm at 2.4 GHz results in an output gain 314 of 22 dB. Thus, the initial gain value 240 is 22 dB.

In one implementation, the initial gain value 240 may be used as the receiver gain value 130. In other implementations, it may be advantageous to use the gain overhead value 242 to provide an additional margin with respect to the connections and minimize disconnection due to transient variations in received signal strength that may result in the received signal having a signal-to-noise ratio insufficient to maintain communication.

In another implementation, the gain overhead value 242 may be added to or subtracted from the initial gain value 240 to determine the receiver gain value 130. The mathematical operation used may depend on the units used. For example, where the initial gain value 240 and the gain overhead value 242 are expressed using positive numbers, the two values may be added together.

At 410 the receiver gain 106 of the receiver and the wireless network interface 104 is configured to use the receiver gain value 130. For example, the default receiver gain 106 of 15 dB may be sufficient for the second connection 114 to be stable but may result in the first connection 108 being limited to operation when the second device 110 is very close to the first device 102. As a result, the user 112 may experience adverse consequences such as the second device 110 failing to reliably communicate with the first device 102. Once the receiver gain 106 has been configured to use the receiver gain value 130 of 27 dB, the reliability the first connection 108 is improved while the second connection 114 also remains reliable. In some situations, the use of the receiver gain value 130 to set the receiver gain 106 may result in over amplification of stronger signals, such as those from the third device 116. However, the effects of this over amplification may be preferred compared to the loss of connectivity resulting from lesser levels of receiver gain 106. In some implementations, the effects of over amplification may also be mitigated as the receiver gain 106 may be further adjusted responsive to the receive strength of an incoming signal during transfer of a packet.

By determining the receiver gain value 130 based on the reception data 120 the system 100 provides various advantages. For example, in a congested RF environment where there may be many other devices using the same channel, the receiver gain 106 may be set at a level that provides the desired communication without raising the sensitivity of the receiver so high that additional unwanted devices are detected. As mentioned above, when the receiver sensitivity is too high, the wireless network interface 104 may experience needless delays while waiting for other transmissions on the channel to cease before transmitting itself.

Illustrative Processes

Figure 5:
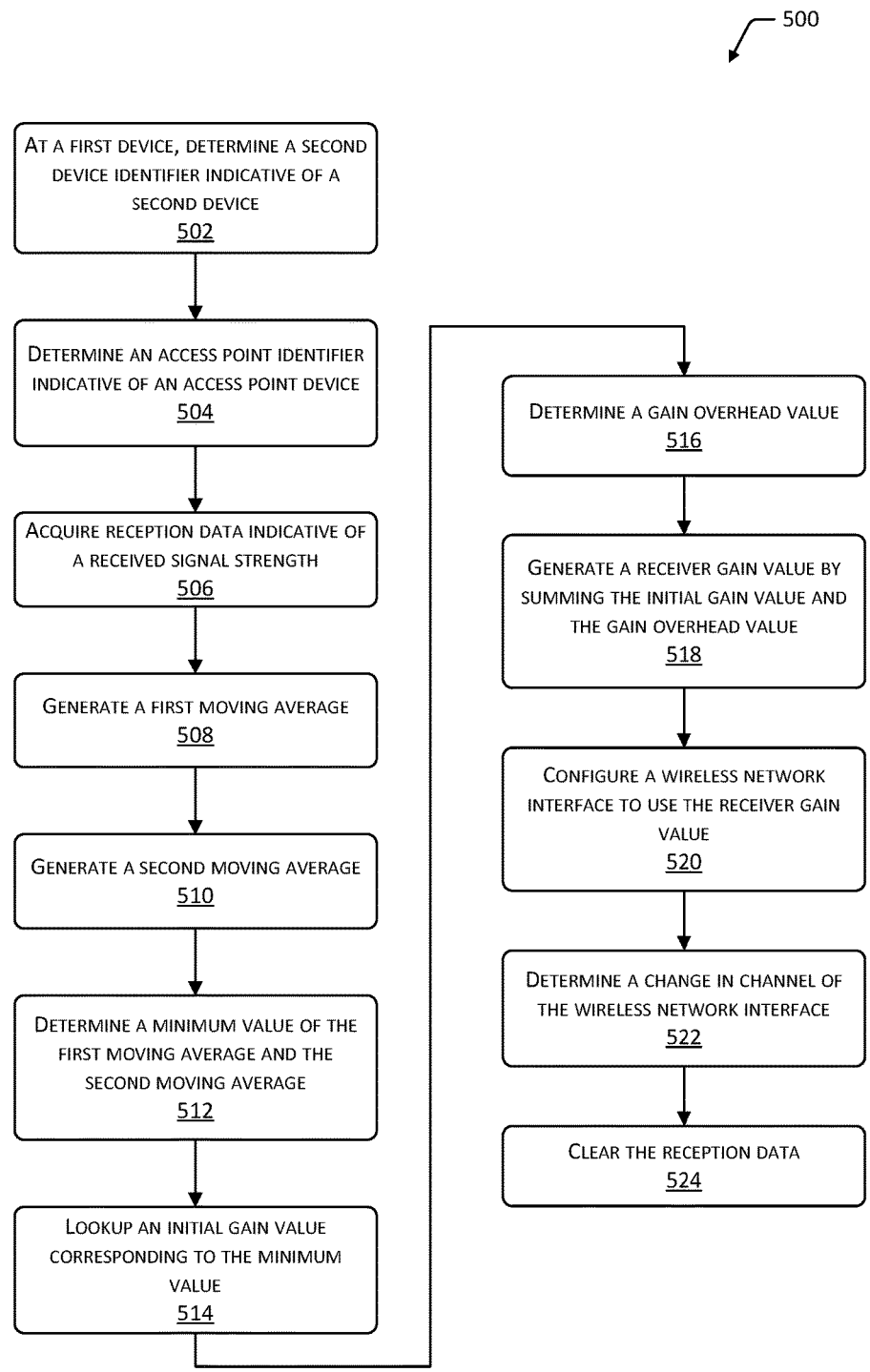
FIG. 5 illustrates a flow diagram of a process to determine and use a receiver gain value, according to one implementation.

FIG. 5 illustrates a flow diagram 500 of a process to determine and use a receiver gain value, according to one implementation. In some implementations, the process may be performed at least in part by the first device 102, the server 138, or other devices.

At 502 at a first device 102 a second device ID 122 indicative of a second device 110 is determined. For example, the second device ID 122 may be obtained from packet headers associated with a first connection 108. The wireless network interface 104 of the first device 102 may include a radio to receive signals from other devices.

At 504 at the first device 102 and access point device ID 122 indicative of a third device 116 is determined, where the third device 116 comprises a wireless access point device. For example, the device ID 122 of an access point may be obtained from packet headers associated with a second connection 114.

At 506 reception data 120 is acquired. As described above, the reception data 120 may comprise a set of records, each record including a device ID 122 indicative of a source of a packet and received signal strength of the signal that carries the packet. The reception data 120 may be acquired using the wireless network interface 104.

At 508 a first calculated value 234(1) is generated. For example, a first moving average from a first plurality of received signal strengths associated with the device identifier 122 of the second device 110 may be calculated. In other implementations, other functions may be used. For example, a weighted moving average may be generated, a moving minimum may be determined, and so forth.

At 510 a second calculated value 234(2) is generated. For example, a second moving average may be calculated from a second plurality of received signal strengths associated with the device identifier of the third device 116 that is an access point device. In other implementations, other functions may be used. For example, a weighted moving average may be generated, a moving minimum may be determined, and so forth.

In some implementations, the calculated values 234 for different device IDs 122 may utilize different numbers of samples 126, mathematical operations, and so forth. For example, the first moving average may be determined using n samples 126 of received signal strengths of the first plurality of received signal strengths where n is a positive integer, that is having a value greater than 1. Continuing the example, the second moving average may be determined using p samples 126 of the second plurality of received signal strengths where p is an integer greater than 1, but where n is less than or equal to p.

As described above, in some implementations calculated values 234 may be determined based at least in part on weight data 236. For example, a first weight profile 304 comprising a first weight value 308(1) and a second weight value 308(2) may be accessed. A first value of a received signal strength may be multiplied by the first weight value 308(1) to generate a first product value. A second value of a received signal strength may be mutiplied by the second weight value 308(2) to generate a second product value. The first product value and the second product value may be summed. A count of the product values may be determined. The sum may then be divided by the count of product values to generate the calculated value 234.

In other implementations, other processes may be used to determine the calculated values 234 using the weight data 236. For example, a sum of the first product value and the second product value may be determined. A sum of weight values, such as the first weight value 308(1) and the second weight value 308(2), may be determined. The sum of the first product and the second product may be divided by the sum of the weight values to generate the calculated value 234.

At 512 an intermediate value is determined. In one implementation the intermediate value may comprise a minimum value of the calculated values 234. For example, the minimum value of the first moving average and the second moving average may be determined.

At 514 an initial gain value 240 corresponding to the minimum value may be determined. For example, the minimum value may be used as the received signal power 312 input to the RTG data 238, and the corresponding output gain 314 may be returned.

In some implementations, a received signal strength overhead value may be added to or subtracted from the initial gain value 240. Instead of, or in addition to, the gain overhead value 242, the initial gain value 240 may be adjusted to provide for additional overhead.

At 516 a gain overhead value 242 may be determined. For example, a predetermined gain overhead value 242 may be retrieved from memory. In some implementations, a determination that the first connection 108 to the second device 110 is lost may result in configuration of the receiver gain 106 to another value. For example, the receiver gain 106 may be set to the maximum available gain, to facilitate restoration of the first connection 108.

At 518 a receiver gain value is generated by summing the initial gain value 240 and the gain overhead value 242. In other implementations other functions may be used to generate the receiver gain value 130. For example, the receiver gain value 130 may be generated by multiplying the initial gain value 240 by a specified factor, such as "1.2". In some implementations the receiver gain value 130 may be set to a maximum available receiver value. For example, responsive to a loss or failure of the first connection 108, the receiver gain value 130 may be set to the greatest gain value supported by the receiver.

At 520 the wireless network interface 104 is configured to use the receiver gain value 130 during operation. For example, an instruction indicative of the receiver gain value 130 may be sent to a microcontroller on the wireless network interface 104 to change the gain of a radio of the wireless network interface 104.

At 522 a change in channels of the wireless network interface 104 is determined. For example, it may be determined that the wireless network interface 104 has been configured to use a second channel.

At 524 the reception data 120 associated with the first channel may be cleared. For example, the reception data 120 that was received on the first channel may be deleted from memory or disregarded from further determinations of the receiver gain value 130. Continuing the example, the reception data 120 from the first channel on a first band may be cleared after the radio of the wireless network interface 104 is configured to use a second channel on a second band.

Figure 6:
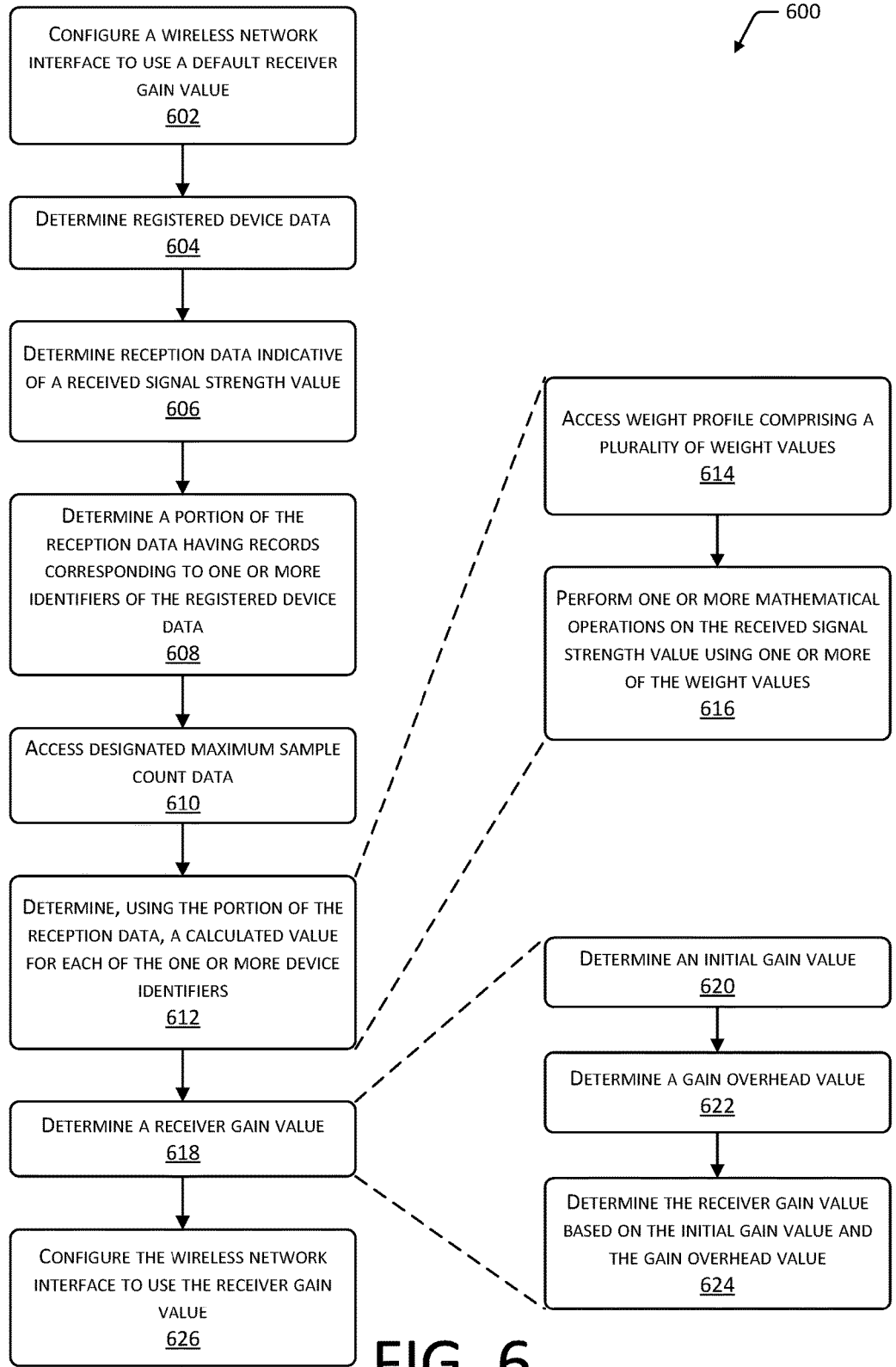
FIG. 6 illustrates a flow diagram of another process to determine and use a receiver gain value, according to one implementation.

FIG. 6 illustrates a flow diagram 600 of another process to determine and use a receiver gain value, according to one implementation. In some implementations, the process may be performed at least in part by the first device 102, the server 138, or other devices.

At 602 a wireless network interface 104 is configured to use a default receiver gain value 130. For example, shortly after activating the wireless network interface 104, there may be insufficient reception data 120 to determine the receiver gain value 130. In some implementations, the default value of the receiver gain 106 may be set to a relatively high value to facilitate communication with other devices. The default value may be greater than the later determined receiver gain value 130.

At 604 registered device data 230 indicative of one or more device identifiers 122 is determined.

At 606, reception data 120 is accessed. In some implementations, the reception data 120 may be acquired only for those devices to which the wireless network interface 104 of the first device 102 has established a connection. For example, referring to FIG. 1, the reception data 120 may include data about the second device 110 and the third device 116, but may omit information about the fourth device 134. In some implementations the device identifier 122 may be obtained from the wireless signals themselves. For example, the MAC address of a packet may be expressed in the modulation of the signal that is received by the first device 102.

At 608, a portion of the reception data 120 having records corresponding to the one or more device identifiers 122 of the registered device data 230 is determined. For example, the reception data 120 may have been acquired while the wireless network interface 104 was in a promiscuous mode and thus obtaining packets that were not explicitly addressed to the wireless network interface 104. The portion may comprise samples 126 that have the one or more device identifiers 122 in the registered device data 230.

In some implementations, the reception data 120 may be acquired from wireless signals sent on a single channel.

At 610 maximum sample count data 232 may be determined. For example, the maximum sample count data 232 may be retrieved that indicates a maximum number of samples 126 that are to be used by the receiver gain management module 118 to generate a calculated value 234. The samples 126 may be designated by count of packets, time, or other metric. For example, the maximum sample count data 232 may indicate that the calculated value 234 is to be determined using no more than 500 samples 126, samples 126 that have been received within the last five minutes, and so forth. A particular maximum sample count may be associated with a particular device ID 122.

At 612 a calculated value 234 for each of the one or more device identifiers 122 is determined using the portion of the reception data 120. In some implementations, the calculated value 234 may be determined using one or more of the operations described with regard to 614 and 616. The calculated value 234 may be determined using a number of samples 126 of the reception data 120 that is less than or equal to the designated maximum sample count data 232. A first calculated value 234(1) may be determined using the reception data 120 associated with a first device identifier 122(1) and a second calculated value 234(2) may be determined using the reception data 120 associated with a second device identifier 122(2).

In some implementations, the calculated value 234 may be generated by processing the RSSVs 124 for a particular device ID 122 using a nonlinear or discrete function. In one implementation, the nonlinear function may comprise a polynomial equation. In another implementation, the nonlinear function may comprise a determination of a moving minimum. The moving minimum may be determined using one or more samples 126.

At 614 weight profile 304 comprising a plurality of weight values 308 may be accessed. In some implementations, the plurality of weight values 308 may decrease relative to one another, such that a first weight value 308(1) is numerically greater than a last weight value 308(X).

At 616, in some implementations one or more mathematical operations may be performed on the RSSVs 124 using one or more of the plurality of weight values 308. For example, a particular RSSV 124 may be multiplied by a particular weight value 308.

In other implementations, the weight profile 304 may comprise a plurality of weight values 308. The one or more mathematical operations on the calculated values 234 may be performed using one or more of the plurality of weight values 308. For example, the first calculated value 234(1) may be multiplied by a first weight value 308(1) while the second calculated value 234(2) may be multiplied by a second weight value 308(2).

At 618 based on one or more of the calculated values 234, a receiver gain value 130 is determined. In some implementations the receiver gain value 130 may be determined using one or more of the operations described with regard to 620, 622, and 624.

At 620 an initial gain value 240 is determined. One or more of the calculated values 234 may be processed to generate an intermediate value. For example, the calculated value 234 that represents the smallest received signal strength will be designated as the intermediate value. The initial gain value 240 may be determined by using the intermediate value as input to the RTG data 238.

At 622 a gain overhead value 242 is determined. As described above, in some implementations the gain overhead value 242 may decrease over time.

At 624 the receiver gain value 130 is determined based at least in part on the initial gain value 240 and the gain overhead value 242. For example, the initial gain value 240 may be added to the gain overhead value 242 to calculate the receiver gain value 130.

At 626 the wireless network interface 104 is configured to use the receiver gain value 130 during operation.

Figure 7:
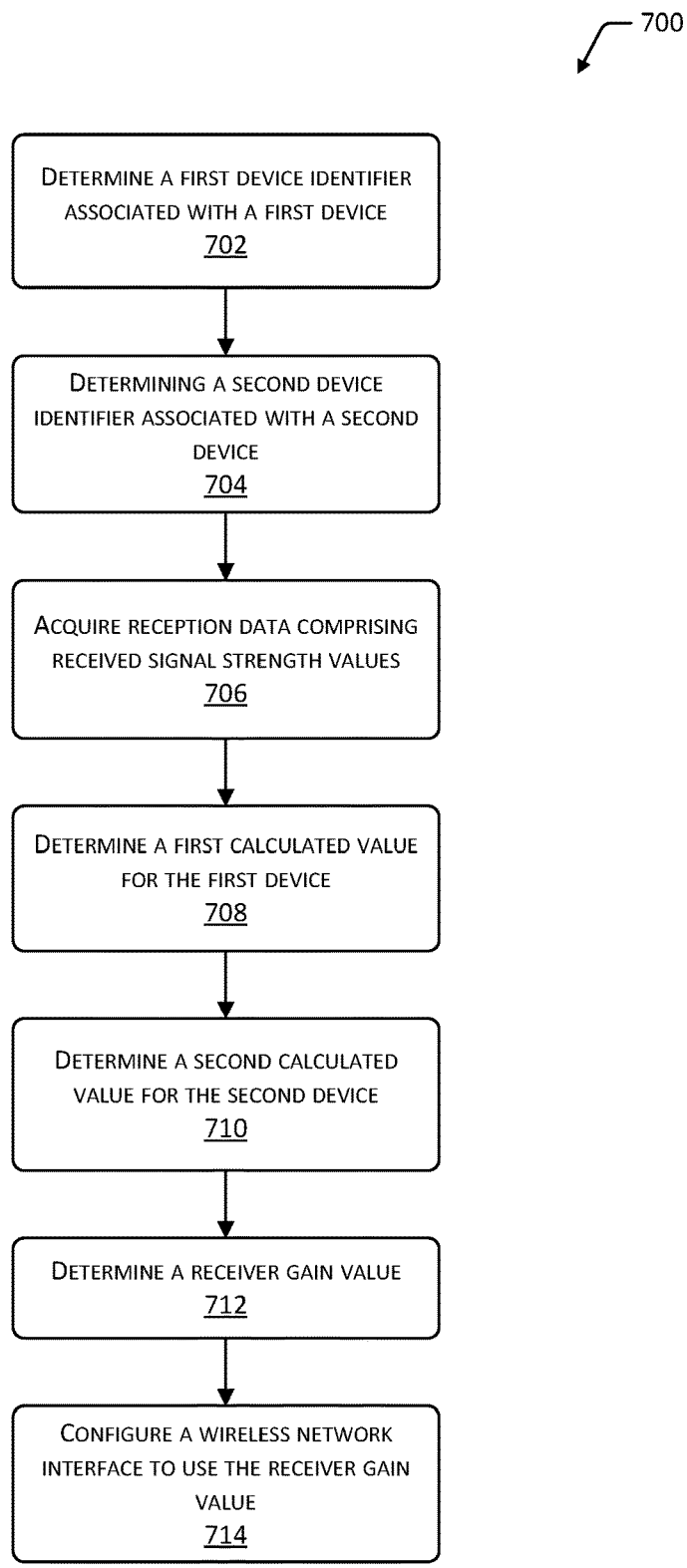
FIG. 7 illustrates a flow diagram of yet another process to determine and use a receiver gain value, according to one implementation.

FIG. 7 illustrates a flow diagram 700 of yet another process to determine and use a receiver gain value, according to one implementation.

At 702 a first device identifier 122(1) associated with a first device 102 connected via a wireless network is determined.

At 704 a second device identifier 122(2) associated with a second device 110 connected via the wireless network is determined.

At 706 reception data 120 associated with the first device identifier 122(1) and the second device identifier 122(2) is acquired. As described above, the reception data 120 comprises RSSVs 124.

At 708 a first calculated value 234(1) for the first device 102 is determined using the reception data 120. In one implementation, the first calculated value 234(1) may be determined by accessing a first plurality of RSSVs 124 associated with the first device identifier 122(1). A first moving average may be calculated from the first plurality of RSSVs 124. The first moving average may be stored or designated as the first calculated value 234(1). In some implementations, the determination of the first calculated value 234(1) may use n samples of RSSVs 124 where n is an integer greater than 1.

At 710 a second calculated value 234(2) for the second device 110 is determined using the reception data 120. In one implementation, the second calculated value 234(2) may be determined by accessing a second plurality of RSSVs 124 associated with the second device identifier 122(2). A second moving average may be calculated from the second plurality of RSSVs 124. The second moving average may be stored or designated as the second calculated value 234(2). In some implementations the determination of the second calculated value 234(2) uses p samples of the RSSVs 124 where p is an integer greater than 1, and further wherein n is less than p, or p is less than n.

In some implementations, weight data 236 may be used to determine the calculated values 234. For example, weight profile 304 comprising a first weight value 308(1) associated with the second device 110 and a second weight value 308(2) associated with the third device 116 may be accessed. The determination of the first calculated value 234(1) may include multiplying a first RSSV 124 associated with the first device identifier 122(1) with the first weight value 308(1) to form a first product. Similarly, the determination of the second calculated value 234(2) may include multiplying a second RSSV 124 associated with the second device identifier 122(2) with the second weight value 308(2) to form a second product.

At 712 a receiver gain value 130 is determined based on the first calculated value 232(1) and the second calculated value 232(2). In one implementation a gain overhead value 242 may be determined. One of the first calculated value 234(1) or the second calculated value 234(2) may be determined to be indicative of a minimum or lesser received signal strength than the other. A gain value may be determined from the minimum calculated value 234, such as using the RTG data 238. The resulting gain value associated with the minimum received signal strength may then be summed with the gain overhead value 242.

In some implementations, the receiver gain value 130 used a first time may be decreased over time. For example, the receiver gain value 130 may be decreased in a predetermined fashion at a second time. Continuing the example, the receiver gain value 130 may be reduced by a fixed amount such as 3 dB after 20 minutes.

In another implementation, the gain overhead value 242 may have a first value at the first time and a second value at the second time. As a result, a first gain overhead value 242(1) may be 5 dB, while a second gain overhead value 242(2) may have a value of 2 dB. A resulting first receiver gain value 130(1) for the first time may have a value of 27 dB, while a reduced receiver gain value 130(2) for the second time may have a value of 23 dB.

The techniques described in this disclosure may improve connectivity between devices that use wireless network interfaces 104. By using the reception data 120 to configure the receiver gain 106 of the receiver, a device is better able to maintain connectivity with two or more other devices on a common channel when those other devices present significantly different received signal strength at the receiver.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Likewise, a particular type of mathematical operation such as addition, subtraction, multiplication, division, and so forth may be replaced with a counterpart. For example, addition may be replaced by subtraction where the signs of the values operated on are changed.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A first device comprising:
a memory storing computer-executable instructions; and
a processor to execute the computer-executable instructions to:
  determine registered device data indicative of a first device identifier and a second device identifier;
  acquire reception data comprising a set of records, each record including:
    a device identifier obtained from a wireless signal, and
    a received signal strength value indicative of a received signal strength of the wireless signal;
  determine, using the reception data, records which correspond to one or more of the first device identifier or the second device identifier;
  access weight profile data comprising one or more first weight values and one or more second weight values;
  determine a first calculated value based on the one or more first weight values and the reception data associated with the first device identifier;
  determine a second calculated value based on the one or more second weight values and the reception data associated with the second device identifier;
  multiply the first calculated value by the one or more first weight values to determine a first product;
  multiply the second calculated value by the one or more second weight values to determine a second product;
  determine a first gain overhead value;
  determine a minimum of the first product and the second product; and
  determine a receiver gain value as a sum of the first gain overhead value and the minimum of one of the first product or the second product.
2. The first device of claim 1, further comprising:
a wireless network interface comprising a radio to receive the wireless signal on a first channel; and
the processor to further execute the computer-executable instructions to:
  configure the radio to the receiver gain value during subsequent reception of one or more wireless signals.

3. The first device of claim 1, wherein the computer-executable instructions to determine the first calculated value further comprise instructions to:
 multiply the received signal strength value with the one or more first weight values to determine the first product;
 multiply a second received signal strength value with the one or more second weight values to determine the second product;
 determine a sum of the first product and the second product;
 determine a count of a number of products; and
 divide the sum by the count.

4. The first device of claim 1, the processor to further execute the computer-executable instructions to:
 retrieve a first designated maximum sample count value associated with the first device identifier and indicative of a maximum number of received signal strength values to determine the first calculated value;
 retrieve a second designated maximum sample count value associated with the second device identifier and indicative of a maximum number of received signal strength values to determine the second calculated value; and
 wherein the computer-executable instructions to determine the first calculated value further comprise instructions to:
  determine a first subset of the reception data associated with the first device identifier, wherein the first subset is limited to at most a maximum number of records indicated by the first designated maximum sample count value; and
 wherein the instructions to determine the second calculated value further comprise instructions to:
  determine a second subset of the reception data associated with the second device identifier, wherein the second subset is limited to at most a maximum number of records indicated by the second designated maximum sample count value.

5. The first device of claim 1, wherein the computer-executable instructions to determine the receiver gain value further comprise instructions to:
 determine a minimum of the first calculated value and the second calculated value;
 configure a radio receiver to the receiver gain value at a first time;
 determine a reduced receiver gain value as a difference between the receiver gain value and a second gain overhead value; and
 configure the radio receiver to the reduced receiver gain value at a second time.

6. The first device of claim 1, the processor to further execute the computer-executable instructions to:
 determine a loss of connection to a second device associated with the first device identifier; and
 configure a radio receiver to a maximum available receiver gain value.

7. The first device of claim 1, the computer-executable instructions to determine the first calculated value further comprise instructions to:
 determine a first subset of the reception data associated with the first device identifier, the first subset comprising a first plurality of received signal strength values; and
 perform one or more calculations based on one or more of the first plurality of received signal strength values as input to a nonlinear function.

8. The first device of claim 1, the processor to further execute the computer-executable instructions to:
 prior to determination of the first calculated value and the second calculated value, set an initial receiver gain value to a default value that is higher than the receiver gain value; and
 wherein the determined receiver gain value is less than the default value.

9. The first device of claim 1, the processor to further execute the computer-executable instructions to:
 establish a first connection with a second device associated with the first device identifier;
 establish a second connection with a third device associated with the second device identifier; and
 wherein the reception data is acquired only for the second device and the third device.

10. The first device of claim 1, wherein the reception data comprises samples having the first device identifier and the second device identifier indicated by the registered device data, and further wherein a maximum number of samples used to generate one or more of the first calculated value or the second calculated value is limited to one or more of a maximum count of packets or a maximum interval of time.

11. A method comprising:
 determining a first device identifier associated with a first device, wherein the first device is connected to a second device wirelessly and the second device uses a radio receiver to receive radio signals from the first device and a third device;
 determining a third device identifier associated with the third device, wherein the third device is connected to the second device wirelessly;
 acquiring reception data indicative of the first device identifier and the third device identifier, wherein the reception data comprises received signal strength values of the radio signals received by the radio receiver from the first device and the third device;
 accessing a first weight value associated with the first device and a third weight value associated with the third device;
 determining a first calculated value for the first device by using the reception data and the first weight value;
 determining a third calculated value for the third device by using the reception data and the third weight value;
 determining a minimum of the first calculated value and the third calculated value;
 determining a receiver gain value as a sum of a first gain overhead value and the minimum of the first calculated value or the third calculated value; and
 configuring the radio receiver to the receiver gain value at a first time.

12. The method of claim 11, wherein the determining the first calculated value comprises:
 multiplying a first received signal strength value associated with the first device identifier with the first weight value to form a first product; and
 wherein the determining the third calculated value comprises:
 multiplying a third received signal strength value associated with the third device identifier with the third weight value to form a third product; and
 the determining the receiver gain value comprises summing the first product and the third product.

13. The method of claim 11, further comprising:
 determining a reduced receiver gain value that is less than the receiver gain value; and configuring the radio receiver to the reduced receiver gain value at a second time.

14. The method of claim 11, further comprising:
determining, at a third time, a loss of connection between the first device and the second device or the third device and the second device; and
configuring the radio receiver to use a maximum available receiver gain value.

15. A first device comprising:
a wireless network interface comprising a radio to receive signals on a first channel from a second device and an access point device;
a memory storing computer-executable instructions; and
a processor to execute the computer-executable instructions to:
determine registered device data indicative of a first device identifier and a second device identifier;
acquire, using the wireless network interface, reception data comprising a set of records, each record includes a device identifier obtained from a wireless signal and a received signal strength value indicative of a received signal strength of the wireless signal;
determine, using the reception data, records which correspond to one or more of the first device identifier or the second device identifier;
acquire, using the wireless network interface, maximum sample count data associated with the first device identifier and the second device identifier;
access weight profile data comprising first weight values and second weight values;
determine a first calculated value based on the first weight values and the reception data associated with the first device identifier;
determine a second calculated value based on the second weight values and the reception data associated with the second device identifier;
determine a minimum of the first calculated value and the second calculated value;
determine a receiver gain value as a sum of a first gain overhead value and the minimum of the first calculated value or the second calculated value; and
configure a radio receiver to the receiver gain value at a first time.

16. The first device of claim 15, wherein the maximum sample count data comprises:
a first maximum sample count value associated with the first device identifier is indicative of a maximum number of received signal strength values to determine the first calculated value; and
a second maximum sample count value associated with the second device identifier is indicative of a maximum number of received signal strength values to determine the second calculated value.

17. The first device of claim 16, wherein:
the computer-executable instructions to determine the first calculated value further comprise instructions to:
determine a first subset of the reception data associated with the first device identifier, wherein the first subset is limited to at most a maximum number of records indicated by the first maximum sample count value; and
the instructions to determine the second calculated value further comprise instructions to:
determine a second subset of the reception data associated with the second device identifier, wherein the second subset is limited to at most a maximum number of records indicated by the second maximum sample count value.

18. The first device of claim 15, wherein the computer-executable instructions to determine the first calculated value further comprise instructions to:
multiply the first calculated value by the first weight values to determine a first product;
multiply a second received signal strength value with the second weight values to determine a second product;
determine a sum of the first product and the second product;
determine a count of a number of products; and
divide the sum by the count.

19. The first device of claim 15, the computer-executable instructions to determine the receiver gain value further comprise instructions to:
determine a reduced receiver gain value as a difference between the receiver gain value and a second gain overhead value; and
configure the radio receiver to the reduced receiver gain value at a second time.

20. The first device of claim 15, wherein the computer-executable instructions to determine the receiver gain value further comprise instructions to:
multiply the first calculated value by the first weight values to determine a first product; and
multiply the second calculated value by the second weight values to determine a second product.

21. The first device of claim 15, wherein the reception data comprises samples having the first device identifier and the second device identifier indicated by the registered device data, and further wherein a maximum number of samples used to generate one or more of the first calculated value or the second calculated value is limited to one or more of a maximum count of packets or a maximum interval of time.

* * * * *

UNITED STATES PATENT AND TRADEMARK OFFICE
CERTIFICATE OF CORRECTION

PATENT NO. : 10,270,481 B1
APPLICATION NO. : 14/978493
DATED : April 23, 2019
INVENTOR(S) : Milos Jorgovanovic et al.

Page 1 of 1

It is certified that error appears in the above-identified patent and that said Letters Patent is hereby corrected as shown below:

In the Claims

Claim 15, Column 23, Lines 38-39:
Currently Reads: "the first calculated value and the second calculated value"
Should Read: "the first calculated value or the second calculated value"

Signed and Sealed this
Eighteenth Day of June, 2019

Andrei Iancu
*Director of the United States Patent and Trademark Office*